US009810063B2

(12) United States Patent
Elkatatny et al.

(10) Patent No.: US 9,810,063 B2
(45) Date of Patent: Nov. 7, 2017

(54) METHOD FOR EVALUATING THE EFFECTIVENESS OF MATRIX ACIDIZING IN A SUBTERRANEAN FORMATION

(71) Applicant: KING FAHD UNIVERSITY OF PETROLEUM AND MINERALS, Dhahran (SA)

(72) Inventors: Salah El-Din Elkatatny, Dhahran (SA); Mohamed Mahmoud, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 129 days.

(21) Appl. No.: 15/071,538

(22) Filed: Mar. 16, 2016

(65) Prior Publication Data

US 2017/0138190 A1 May 18, 2017

Related U.S. Application Data

(60) Provisional application No. 62/254,567, filed on Nov. 12, 2015.

(51) Int. Cl.
*E21B 49/08* (2006.01)
*E21B 43/25* (2006.01)
(Continued)

(52) U.S. Cl.
CPC ............ *E21B 49/086* (2013.01); *E21B 43/25* (2013.01); *E21B 43/26* (2013.01); *E21B 41/0035* (2013.01); *E21B 2049/085* (2013.01)

(58) Field of Classification Search
CPC ........ E21B 49/086; E21B 43/25; E21B 43/26; E21B 41/0035; E21B 2049/085; E21B 49/087
See application file for complete search history.

(56) References Cited

U.S. PATENT DOCUMENTS 3,734,186 A * 5/1973 Williams ................. C09K 8/78
166/282
4,646,835 A 3/1987 Watkins et al.
(Continued)

FOREIGN PATENT DOCUMENTS

WO 94/15070 A1 7/1994
WO 2011/141875 A2 11/2011

OTHER PUBLICATIONS

Maryam Dehghani, "Matrix Acid Stimulation", The 1st International Applied Geoligcal Congress, Apr. 2010, pp. 2024-2028.
(Continued)

*Primary Examiner* — Brad Harcourt
(74) *Attorney, Agent, or Firm* — Oblon, McClelland, Maier & Neustadt, L.L.P.

(57) ABSTRACT

A method of evaluating the effectiveness of matrix acidizing treatment in a subterranean formation surrounding a wellbore that involves injecting a plurality of cationic salts into multiple sections of the subterranean formation before acidizing treatment, followed by collecting the cationic salts at the surface of the wellbore after producing the wellbore. A permeability recovery factor is calculated from a concentration ratio of the injected salt to the collected salt. The permeability recovery factor shows the effectiveness of the acidizing treatment. The permeability recovery factor also indicates the contribution of each individual section of the formation to the total production flow.

20 Claims, 6 Drawing Sheets

(51) Int. Cl.
 *E21B 43/26* (2006.01)
 *E21B 41/00* (2006.01)

(56) References Cited

U.S. PATENT DOCUMENTS

2009/0308599 A1  12/2009  Dusterhoft et al.
2014/0332212 A1  11/2014  Ayers et al.

OTHER PUBLICATIONS

A K Pandey, "Well Stimulation Techniques", Workshop on Technology Imperatives for Exploration and Production of Oil & Gas, (Dec. 21-24), 149 pages.

* cited by examiner

METHOD FOR EVALUATING THE EFFECTIVENESS OF MATRIX ACIDIZING IN A SUBTERRANEAN FORMATION

BACKGROUND OF THE INVENTION

Technical Field

The present invention relates to a method of evaluating the effectiveness of matrix acidizing treatment in a subterranean formation by injecting a plurality of salt solutions into multiple sections of the subterranean formation before an acidizing treatment, and collecting the salt solutions at the surface of the wellbore after producing the wellbore, followed by comparing the concentration of the injected salt solution to the collected salt solution.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Directional wells such as multilateral wells, shown in FIG. 1, and maximum reservoir contact (MRC) wells, are among the type of wells that are used nowadays to increase the production rate from an underground hydrocarbon reservoir. Well stimulation, along with the directional drilling technologies, is the key to maintain productivity of these types of wells. Reservoir characteristics, borehole stability, formation damage, zonal isolation, and hydraulic fracturing need to be considered during stimulation operations. Directional wells such as MRC and/or multilateral wells are usually drilled into low permeability reservoirs. Stimulation treatment is important for deciding whether directional wells can be successfully produced.

Formation damage that occurs during drilling may cause a significant drop in productivity of directional wells. Effective stimulation treatment is important to recover and enhance the performance of these wells. In most cases, a pre-completion clean-up step is carried out to reduce the formation damage.

Stimulation treatment in multi-lateral and MRC wells generally begins by removing the drilling filter cake from the sand face and ends with penetrating the invaded or damaged zone in the near wellbore area either by acid treatment or by hydraulic fracturing.

Two acid stimulation techniques are commonly used to treat multilateral wells. The first technique is tubing stimulation whereby tubing is run through the production tubing of a multilateral well to selectively treat individual laterals in the main reservoir. There are two challenges when coiled tubing is used to transport a stimulation fluid during stimulation treatment. The first is to accurately access the laterals in a multi-lateral well, and the second is to inject the stimulation fluid into the subterranean formation surrounding the target section without damaging the nearby permeable sections. Garzon et al. provided a method for successful stimulation of a target zone in a lateral well by using Fiberoptics enabled coiled tubing (FOECT). Real time distributed temperature survey (DTS) profiles were also shown to enable modification of the stimulation treatment [Garzon, F. O., Amorocho, J. R., Al-Harbi, M., Al-Shammari, N. S., Al-Ruwaished, A., Ayub, M., Noya, J. V. 2010, "Stimulating Khuff Gas Wells with Smart Fluid Placement", Paper SPE 131917, SPE Deep Gas Conference and Exhibition, Manama, Bahrain, 24-26 Jan. 2010; incorporated herein by reference in its entirety]. The second acid stimulation technique involves pumping an acid solution from the surface of the well through the production tubing (i.e. bullhead stimulation treatments).

Although, acid stimulation was shown to be an effective treatment for directional wells, it was not the preferred treatment for tight reservoirs. Accordingly, acid fracturing was found to be the most effective stimulation treatment in directional wells in tight reservoirs [Joshi, S. D. 2003, "Cost/Benefits of Horizontal Wells", Paper SPE 83621, SPE Western Regional/AAPG Pacific Section Joint Meeting, Long Beach, Calif. 19-24 May 2003; incorporated herein by reference in its entirety]. Acid fracturing refers to a stimulation treatment of a subterranean formation, wherein acid is pumped into the wellbore with a pressure above fracture pressure of the subterranean formation to cause hydraulic fractures in the formation. Acid also causes to etch the open faces of the induced fractures.

However, effective stimulation requires the acid to be diverted across all intermediate intervals to reach the low permeability sections. The use of diverting additives combined with stimulation treatments can increase the productivity of some multilateral wells, but in many cases this diversion technique is not effective in stimulating the desired number of laterals. For example, overstimulation of the heel section with untreated toe section is one of the challenges of stimulating long horizontal sections especially when reservoir pressure varies from the heel section to the toe section [SAU, R., Shuchart, C. E., & Grubert, M. A. 2014, "Advanced Completion and Stimulation Design Model for Maximum Reservoir Contact Wells", Paper SPE 171800, Abu Dhabi International Petroleum Exhibition and Conference, Abu Dhabi, UAE, 10-13 Nov. 2014; incorporated herein by reference in its entirety].

One way of evaluating the effectiveness of stimulation treatments in a directional well is through using production logging. Production logs are often used to evaluate the effectiveness of stimulation treatments as well as for design and procedural modifications. To avoid the complexity of a stimulation fluid system that includes the use of acid diverters, and also to avoid the failure of acid diversion, multistage lateral stimulation is used by dividing each lateral into smaller segments and stimulating each segment individually.

One important aspect of stimulation treatments and production logs is the cost of these operations. Cost of stimulation treatment of directional wells such as MRC, multilateral, or horizontal wells increases proportionately with borehole length. For example, treatment of a well that has a total completion section length of about 10,000 ft requires at least 300,000 gallons of acid. The cost of such an operation is expected to be around 0.5-0.7 million dollars depending on the contract conditions, location of the well and prevailing prices [Aslam, J., & Al Salat, T. 1998, "Stimulation of Horizontal Wells in Carbonate Reservoirs", Paper SPE 49493, Abu Dhabi International Petroleum Exhibition and Conference, Abu Dhabi, United Arab Emirates, 11-14 Nov. 1998; incorporated herein by reference in its entirety]. Therefore, the high cost of stimulation calls for more efficient and cost effective alternatives for stimulation treatments and production logs.

In view of the forgoing, one objective of the present invention is to provide an alternative method for production logging that evaluate the effectiveness of a stimulation treatment. The method is applicable to all different types of directional wells such as horizontal, extended reach, multilateral, and MRC wells.

BRIEF SUMMARY OF THE INVENTION

According to a first aspect, the present disclosure relates to a method of evaluating the effectiveness of matrix acidizing in a subterranean formation surrounding a well, involving i) injecting a first concentration of at least one salt solution into the subterranean formation, ii) matrix acidizing the subterranean formation by injecting a stimulation fluid, iii) producing the well to form a formation fluid, iv) collecting a fluid mixture comprising the formation fluid, the stimulation fluid, and a second concentration of at least one salt solution at a surface of the well, v) determining a permeability recovery by calculating a ratio of the second concentration of at least one salt solution to the first concentration of at least one salt solution.

In one embodiment, the method further comprises comparing the permeability recovery with a permeability recovery threshold to evaluate the effectiveness of matrix acidizing in the subterranean formation.

In one embodiment, the matrix acidizing is effective in restoring permeability of the subterranean formation when the permeability recovery is at least 60%.

In one embodiment, salt in the salt solution is at least one selected from the group consisting of potassium chloride, cesium chloride, ammonium chloride, barium chloride, and manganese chloride.

In one embodiment, the salt is soluble in water.

In one embodiment, the salt is chemically inert in the formation fluid or the stimulation fluid.

In one embodiment, the stimulation fluid is injected into the subterranean formation at a pressure to fracture the formation.

In one embodiment, the stimulation fluid comprises at least one selected from the group consisting of hydrochloric acid, acetic acid, formic acid, hydrofluoric acid, oxalic acid, and fluoroboric acid.

In one embodiment, the well is selected from the group consisting of a vertical well, a horizontal well, a multi-lateral well, an extended reach well, and a maximum reservoir contact well.

In one embodiment, the subterranean formation is a heterogeneous formation.

According to a second aspect, the present disclosure relates to a method of evaluating the effectiveness of matrix acidizing in a subterranean formation in a plurality of sections of a well, involving i) dividing the well into the plurality of sections, ii) injecting a first concentration of a first salt solution into a first section, iii) injecting a first concentration of a second salt solution into a second section, iv) matrix acidizing the subterranean formation by injecting a stimulation fluid into the subterranean formation surrounding the plurality of sections, v) producing the well to form a formation fluid, vi) collecting a fluid mixture comprising the formation fluid, the stimulation fluid, a second concentration of the first salt solution, and a second concentration of the second salt solution at a surface of the well, vii) determining a permeability recovery in the first section by calculating a ratio of the second concentration of the first salt solution to the first concentration of the first salt solution, and a permeability recovery in the second section by calculating a ratio of the second concentration of the second salt solution to the first concentration of the second salt solution In one embodiment, the method further comprises comparing the permeability recovery of the first and the second section with a permeability recovery threshold.

In one embodiment, the first salt solution is the same as the second salt solution.

In one embodiment, the first salt solution is different than the second salt solution.

In one embodiment, the first concentration of the first salt solution is the same as the first concentration of the second salt solution.

In one embodiment, the first concentration of the first salt solution is different than the first concentration of the second salt solution.

In one embodiment, the well is selected from the group consisting of a vertical well, a horizontal well, a multi-lateral well, an extended reach well, and a maximum reservoir contact well.

In one embodiment, the method further comprises determining a permeability variation along the length of the well from the permeability recovery of the first and the second section.

In one embodiment, the stimulation fluid is diverted and the method is employed to evaluate the effectiveness of diverting from the permeability recovery of the first and the second section.

In one embodiment, the method further comprises determining a contribution of each of the first and the second section to a total production of the formation fluid from the permeability recovery of the first and the second section.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
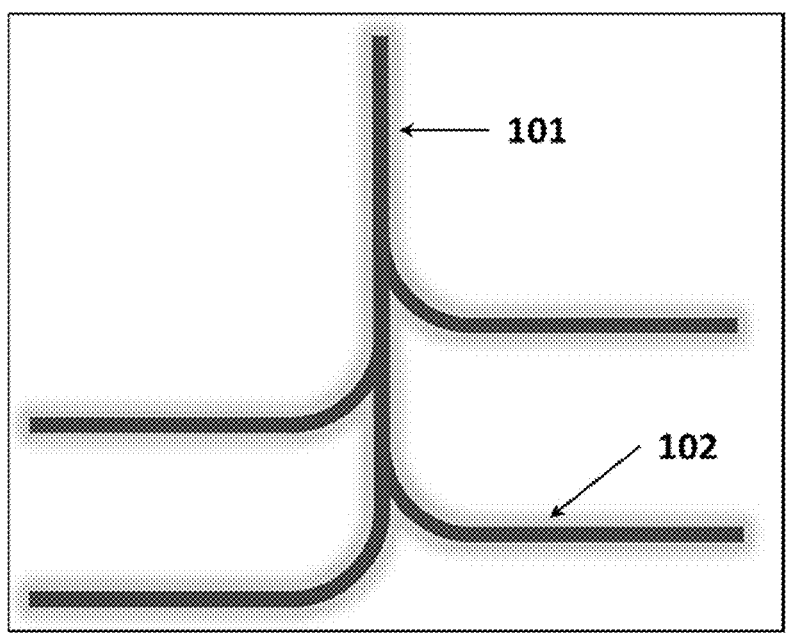
FIG. 1 illustrates a multi-lateral well with horizontal lateral sections.

Referring now to the drawings, wherein like reference numerals designate identical or corresponding parts throughout the several views.

Figure 2:
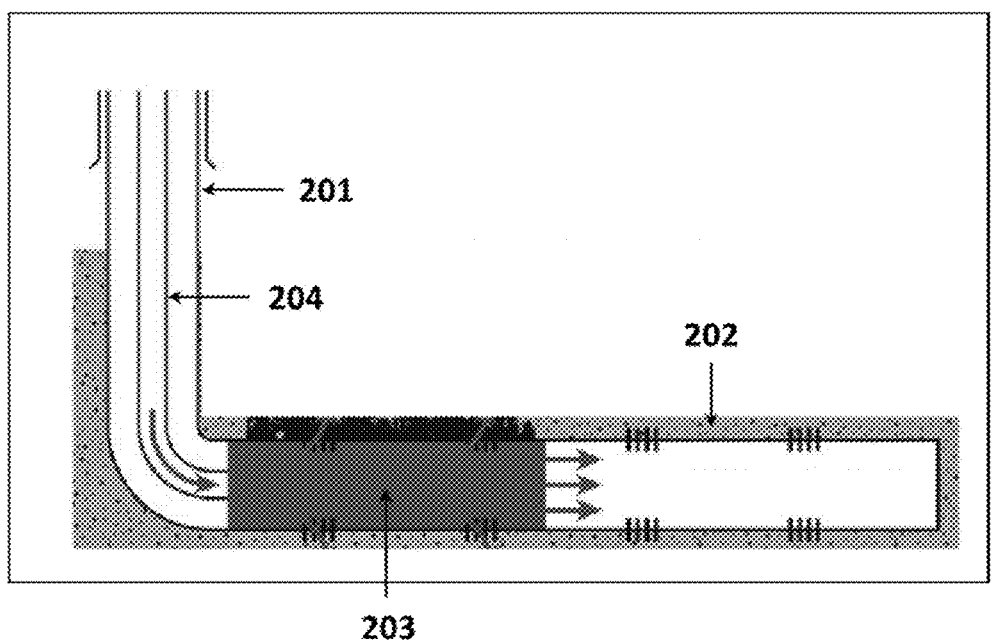
FIG. 2 illustrates a horizontal well during a stimulation treatment.

Referring now to FIG. 2. According to a first aspect, the present disclosure relates to a method of evaluating the effectiveness of matrix acidizing in a subterranean formation 202 surrounding a well 201, involving injecting a first concentration of a salt solution into the subterranean formation.

Subterranean formation refers to a subsurface body of geological formations around a wellbore (i.e. an uncased portion of a well) having sufficient porosity and permeability to store and transfer fluids. A subterranean formation may be a carbonate formation, a sandstone formation, a shale formation, or a clay formation.

In one embodiment, the subterranean formation 202 is a carbonate formation. The carbonate formation refers to a formation which may primarily be composed of carbonate minerals, such as calcite, aragonite, dolomite, and so forth. Two major types of carbonate formations are limestone and dolostone. In one embodiment, the subterranean formation 202 is a sandstone formation. The sandstone formation refers to a formation which may primarily be composed of quartz, feldspar, rock fragments, mica and numerous additional mineral grains held together with silica and/or cement. In one embodiment, the subterranean formation 202 is a shale formation. The shale formation refers to a fine-grained formation which may primarily be composed of clay minerals, and quartz. In one embodiment, the subterranean formation 202 is a clay formation. The clay formation refers to a formation which may primarily be composed of chlorite, illite, kaolinite, montmorillonite and smectite.

The subterranean formation 202 may be a heterogeneous formation. A heterogeneous formation refers to a formation whose physical properties vary with location. In one embodiment, the subterranean formation 202 may be a homogenous formation. A homogenous formation refers to a formation whose physical properties do not vary from place to place in the well.

In one embodiment, the subterranean formation 202 surrounding the well 201 comprises one or more of natural gas, oil, gas condensate, and water.

Matrix acidizing is one type of stimulation treatment of a subterranean formation, wherein a stimulation fluid, which may be an aqueous acid solution, is delivered to the subterranean formation with a pressure below a fracture pressure of the subterranean formation. During matrix acidizing the stimulation fluid penetrates the subterranean formation, dissolve sediments and mud solids, and removes formation damage that may be inhibiting the permeability of the formation and/or ingress of fluids from the subterranean formation into the well.

The mechanism of the matrix acidizing may vary depending on the type of the subterranean formation. In one embodiment, the subterranean formation 202 is a sandstone formation, wherein the stimulation fluid 203 reacts with soluble substances in the subterranean formation 202 to enlarge pore spaces. In one embodiment, the subterranean formation 202 is a carbonate formation, wherein the stimulation fluid 203 dissolves at least a portion of the subterranean formation 202.

Stimulation treatment refers to any treatment performed to restore or enhance productivity of a well. The stimulation treatment may be, for example, matrix acidizing or acid fracturing.

Stimulation fluid (also referred to herein as "treatment fluid") may refer to a fluid mixture that is prepared for the stimulation treatment. In one embodiment, the stimulation fluid 203 is an acid. In one embodiment, the stimulation fluid 203 is at least one selected from the group consisting of an organic acid, an inorganic acid, hydrochloric acid, acetic acid, formic acid, hydrofluoric acid, oxalic acid, and fluoroboric acid. In one or more embodiments, the stimulation fluid 203 may vary depending on the type of the subterranean formation 202. For example, hydrochloric acid may be used as the stimulation fluid 203 when the subterranean formation 202 is a carbonate formation. In one embodiment, a mixture of hydrochloric acid, acetic acid, and formic acid is used as the stimulation fluid for treating carbonate formations, wherein concentration of hydrochloric acid in the mixture is in the range of 10-30 wt %, preferably 15-28 wt %, more preferably 15-20 wt %. In one embodiment, a mixture of hydrochloric acid and hydrofluoric acid may be used as the stimulation fluid for treating sandstone formations, wherein volume ratio of hydrochloric acid to hydrofluoric acid may be in the range of 2:1-12:1, preferably 4:1-9:1, more preferably 5:1-7:1. In one embodiment, pH of the stimulation fluid is in the range of 0-13, or preferably 1-6, or preferably 3-6, or preferably around 5. In one embodiment, the stimulation fluid is injected to the subterranean formation with a flow rate in the range of 10-10,000 l/min, preferably 50-5,000 l/min, or preferably 50-1,000 l/min, or preferably 50-500 l/min, or preferably 100-200 l/min. Volume of the injected stimulation fluid may be at least 1,000 liter (l), or at least 10,000 l, or at least 20,000 l, or at least 30,000 l, or at least 40,000 l, or at least 50,000 l, or at least 100,000 l, or at least 200,000 l, or at least 300,000 l, or at least 400,000 l, or at least 500,000 l, relative to the length of the well which may be at least 10 m, or at least 100 m, or at least 200 m, or at least 300 m, or at least 400 m, or at least 500 m, or at least 1,000 m, or at least 2,000 m, or at least 3,000 m, or at least 4,000 m, or at least 5,000 m.

In one embodiment, the well 201 may or may not have a casing or tubing. "Well" as used herein also refers to "wellbore", and therefore these terms may be used interchangeably.

Exemplary of the well 201 include, but not limited to vertical well, horizontal well, multilateral well, extended reach well, and maximum reservoir contact (MRC) well.

A horizontal well is one type of directional well that has a horizontal lateral section, wherein the horizontal lateral section forms an inclination angle of at least 80°, or at least 85°, or at least 86°, or at least 87°, or at least 88°, or at least 89°, or at least 90° with the vertical section. Horizontal wells are employed to enhance reservoir performance and production by placing a long wellbore section within a reservoir to increase a reservoir contact.

Referring now to FIG. 1. A multilateral well is one type of directional well wherein several laterals 102 extend outwardly from a main/central borehole 101.

Extended reach well is one type of directional well in which ratio of a measured depth to a true vertical depth (TVD) is at least 2, or at least 5, or at least 10. True vertical depth refers to a vertical distance from a point in the well (usually a current or a final depth) to a point at the surface of the well.

Maximum reservoir contact (MRC) well is one type of directional well that provides an aggregate reservoir contact of at least 2 km, or at least 5 km, or at least 6 km, or at least 8 km, through a single or a multi-lateral configuration.

Injecting refers to a process whereby a liquid mixture (e.g. a salt solution, a stimulation fluid, etc.) is transferred from a surface of the well to a localized section of the well, followed by inserting the liquid mixture to the subterranean formation surrounding the localized section of the well. In one embodiment, transferring the liquid mixture is performed through a tube or a pipe. In one embodiment, inserting the liquid mixture to the subterranean formation 202 is performed using a nozzle located on one end of the tube or the pipe. In one embodiment, the nozzle is a perforated cap located on the one end of the tube or the pipe, wherein perforations are on the perimeter of the nozzle to create a radial flow.

In one embodiment, the salt is composed of an inorganic metal and an inorganic non-metal. Exemplary inorganic metals include, but are not limited to aluminum, sodium, potassium, manganese, barium, magnesium, calcium, cesium, and other metals from the first and the second column of periodic table and/or transition metals. Exemplary inorganic non-metals include, but are not limited to chlorine, fluorine, bromine, and iodine. Exemplary salts include, but are not limited to lithium chloride, sodium chloride, potassium chloride, cesium chloride, magnesium chloride, calcium chloride, barium chloride, and manganese chloride, iron chloride, nickel chloride, copper chloride, zinc chloride, ammonium chloride, lithium bromide, sodium bromide, potassium bromide, cesium bromide, magnesium bromide, calcium bromide, barium bromide, and manganese bromide, iron bromide, nickel bromide, copper bromide, zinc bromide, and ammonium bromide. In one embodiment, the subterranean formation comprises at least one formation salt, and the salt is selected to avoid interference with the formation salt.

In one embodiment, the salt has to be chemically inert in the formation fluid and the stimulation fluid to prevent precipitation of minerals scales. A chemically inert salt as used herein refers to a salt that does not initiate a chemical reaction, or involve in a chemical reaction. The salt may not be ionized, or may not be converted to another chemical compound. In one embodiment, the salt may dissolve in the formation fluid and/or stimulation fluid.

In one embodiment, the salt solution is injected to the subterranean formation with a flow rate in the range of 1-1,000 l/min, preferably 5-500 l/min, or preferably 5-100 l/min, or preferably 5-50 l/min, or preferably 10-20 l/min. Volume of the injected salt solution may be at least 10 liter (l), or at least 100 l, or at least 200 l, or at least 300 l, or at least 400 l, or at least 500 l, or at least 1,000 l, or at least 2,000 l, or at least 3,000 l, or at least 4,000 l, or at least 5,000 l, or at least 10,000 l, relative to the length of the well which may be at least 10 m, or at least 100 m, or at least 200 m, or at least 300 m, or at least 400 m, or at least 500 m, or at least 1000 m, or at least 2,000 m, or at least 3,000 m, or at least 4,000 m, or at least 5,000 m, or at least 10,000 m.

The first concentration of the salt solution as used herein refers to an initial concentration of the salt in the salt solution being injected to the subterranean formation 202. In one embodiment, the salt is dissolved in a solvent to form the salt solution. In one embodiment, the salt is dissolved in water to form the salt solution. In one embodiment, the salt in the salt solution is highly soluble in water, wherein solubility of the salt in water at 20° C. is at least 0.1 g/ml, or at least 0.2 g/ml, or at least 0.3 g/ml, or at least 0.4 g/ml, or at least 0.5 g/ml, or at least 0.6 g/ml, or at least 0.7 g/ml, or at least 0.8 g/ml. In one embodiment, the initial concentration of the salt in the salt solution is in the range of 100-500,000 ppm, or preferably 500-100,000 ppm, or preferably 500-50,000 ppm, or preferably 500-40,000 ppm, or preferably 500-30,000 ppm, or preferably 500-20,000 ppm, or preferably 500-10,000 ppm, or preferably 500-5,000 ppm, or preferably 500-4,000 ppm, or preferably 500-3,000 ppm, or preferably 500-2,000 ppm, or preferably 500-1,500 ppm, or preferably around 1,000 pm. In one embodiment, the salt solution comprises at least a plurality of salts, wherein the initial concentration of each salt in the solution is in the range of 100-500,000 ppm, or preferably 500-100,000 ppm, or preferably 500-50,000 ppm, or preferably 500-40,000 ppm, or preferably 500-30,000 ppm, or preferably 500-20,000 ppm, or preferably 500-10,000 ppm, or preferably 500-5,000 ppm, or preferably 500-4,000 ppm, or preferably 500-3,000 ppm, or preferably 500-2,000 ppm, or preferably 500-1,500 ppm, or preferably around 1,000 pm.

The method involves matrix acidizing the subterranean formation 202 by injecting a stimulation fluid 203.

In one embodiment, matrix acidizing is performed right after completion of salt injection. In one embodiment, matrix acidizing is performed with a delay after completion of salt injection. The delay between completion of salt injection and matrix acidizing may be between 1-100 hours, or preferably 1-90 hours, or preferably 1-80 hours, or preferably 1-70 hours, or preferably 1-60 hours, or preferably 1-50 hours, or preferably 1-40 hours, or preferably 1-30 hours, or preferably 1-20 hours, or preferably 1-10 hours, or preferably 1-5 hours, or preferably 1-4 hours, or preferably 1-3 hours, or preferably 1-2 hours.

Injecting the stimulation fluid as used herein refers to a process of transferring the stimulation fluid from the surface of the well to a target section in the well, followed by inserting the stimulation fluid into the subterranean formation surrounding the target section. The target section may be the entire well, or the target section may be a portion of the well. In one embodiment, the well 201 involves a production tubing 204, and the injection process is carried out by pumping the stimulation fluid 203 through a production tubing 204. In one embodiment, the transferring the stimulation fluid is through coiled tubing located inside the production tubing 204 to selectively stimulate target sections in the well 201. In one embodiment, the salt solution and the stimulation fluid are mixed to form a homogenous mixture, and the homogenous mixture is injected to the subterranean formation.

Injecting the stimulation fluid may be carried out with a pressure below a fracture pressure of the subterranean formation (i.e. matrix acidizing) to enable the stimulation fluid to penetrate the subterranean formation, dissolve sediments and mud solids and remove formation damages that may be inhibiting the permeability of the formation. Injection pressure in matrix acidizing may be in the range of 1,000-30,000 psi, or preferably, 1,500-25,000 psi, or preferably 1,500-20,000 psi, or preferably 1,500-15,000 psi, or preferably 1,500-10,000 psi. Injecting the stimulation fluid may be carried out with a pressure above the fracture pressure of the subterranean formation (i.e. acid fracturing) to induce fractures in the subterranean formation by the stimulation fluid, followed by etching open faces of the induced fractures. When acid fracturing is completed and the induced fractures are closed, etched faces may provide a greater permeability recovery. Injection pressure in acid fracturing may be in the range of 1,000-30,000 psi, or preferably, 1,500-25,000 psi, or preferably 1,500-20,000 psi, or preferably 1,500-15,000 psi, or preferably 1,500-10,000 psi.

The method may include producing the well 201 to form a formation fluid. Producing refers to a process whereby a well is returned to operation after completion of the stimulation treatment. In one embodiment, the process may involve depressurizing the stimulation fluid 203. In one embodiment, the process may involve sucking the stimulation fluid to the surface of the well using a pump.

Formation fluid refers to any fluid that occurs in pores of the subterranean formation surrounding the well. Formation fluid also refers to any fluid which is found in a reservoir. Exemplary of formation fluid include, but not limited to liquid and/or gaseous hydrocarbon compositions such as natural gas, oil, and/or gas condensate, and water.

The method involves collecting a fluid mixture comprising the formation fluid, the stimulation fluid 203, and a second concentration of the salt solution at the surface of the well 201.

Collecting may refer to a process of capturing the fluid mixture exiting the subterranean formation at the connection of the wellbore and the lateral and/or at the surface where the wellbore enters the earth. The fluid may be captured through a set of pipelines attached to a borehole at the surface of the well to collect the fluid mixture. In one embodiment, the collecting may further involve transferring the fluid mixture to a storage tank through another set of pipelines.

The fluid mixture as used herein refers to a flow-back fluid mixture that comprises at least the formation fluid, a portion of the stimulation fluid injected into the well, and at least a portion of the salt in the salt solution injected into the well bore. In one embodiment, the fluid mixture is transported to the surface of the well using a pump. In one embodiment, the fluid mixture is transported to the surface of the well by a hydrostatic flow back pressure from the formation fluid. The fluid mixture may also be lifted to the surface of the well. The hydrostatic flow back pressure refers to a pressure that causes existing fluids in a well to flow backward in the well, usually after a stimulation treatment.

In one embodiment, a real-time concentration probe is installed across the flow-back fluid mixture at the surface of the well to provide an in-situ measurement of an instantaneous and a cumulative concentration of the salt solution in the flow-back fluid mixture. In one embodiment, collecting the fluid mixture continues until the instantaneous concentration of the salt solution in the flow-back fluid mixture becomes zero. In one embodiment, a plurality of real-time concentration probes is installed across the flow-back fluid mixture at the surface of the well, wherein the plurality of real-time concentration probes provides in-situ measurement of instantaneous and cumulative concentrations of a plurality of salt solutions in the flow-back fluid mixture.

The second concentration of the salt solution as used herein refers to the cumulative concentration of the salt solution being collected at the surface of the well 201 after completion of collecting the fluid mixture. In one embodiment, the second concentration of the salt solution is in the range of 100-500,000 ppm, or preferably 200-100,000 ppm, or preferably 200-50,000 ppm, or preferably 200-40,000 ppm, or preferably 200-30,000 ppm, or preferably 200-20,000 ppm, or preferably 200-10,000 ppm, or preferably 200-5,000 ppm, or preferably 200-4,000 ppm, or preferably 200-3,000 ppm, or preferably 200-2,000 ppm, or preferably 200-1,000 ppm.

The method involves determining a permeability recovery by calculating a ratio of the second concentration of the salt solution to the first concentration of the salt solution.

Permeability of a formation refers to a measure of the formation's ability to transport/transfer fluids. In one embodiment, a well logging tool is employed to measure an initial permeability log along the well. Permeability log refers to a record of continuous measurement of permeability along the well. Well logging tool refers to a type of device that measures one or more physical properties of the subterranean formation around a well versus depth and/or time. In one embodiment, the initial permeability is in the range of 20-2,000 millidarcy (md), preferably 20-1,000 md, or preferably 20-500 md, or preferably 20-400 md, or preferably 20-300 md, or preferably 20-200 md, or preferably 20-150 md, or preferably 30-150 md, or preferably 40-100 md.

Furthermore, permeability recovery refers to a degree of enhancement of a formation's permeability after a stimulation treatment. "Permeability recovery" as used herein also refers to "permeability recovery near the wellbore", and therefore these phrases may be used interchangeably. Near the wellbore may refer to a radial or a horizontal depth in the range of 1-200 cm, or preferably 1-100 cm, or preferably 5-100 cm, or preferably 10-100 cm from a point on the surface of the wellbore to the subterranean formation in a radial or a horizontal direction.

In one embodiment, the determining involves calculating the ratio of the second concentration of the salt solution to the first concentration of the salt solution, followed by evaluating the permeability recovery in the subterranean formation based on the ratio of the second concentration of the salt solution to the first concentration of the salt solution. In one embodiment, the ratio of the second concentration of the salt solution to the first concentration of the salt solution is a measure of the permeability recovery in the subterranean formation. In one embodiment, the ratio of the second concentration of the salt solution to the first concentration of the salt solution is the permeability recovery in the subterranean formation. In one embodiment, the subterranean formation is a sandstone formation and the permeability recovery is in the range of 0-1, preferably 0.1-0.9, more preferably 0.2-0.9. In one embodiment, the subterranean formation is a sandstone formation and the ratio of the second concentration of the salt solution to the first concentration of the salt solution is in the range of 0-1, preferably 0.1-0.9, more preferably 0.2-0.9.

In one embodiment, the method further comprises comparing the permeability recovery with a permeability recovery threshold to evaluate the effectiveness of matrix acidizing in the subterranean formation. In one embodiment, the matrix acidizing is evaluated as effective (i.e. successful) when the permeability recovery is greater than the permeability recovery threshold. In one embodiment, the matrix acidizing is not effective/successful when the permeability recovery is less than or equal to the permeability recovery threshold.

In one embodiment, the subterranean formation is a sandstone formation and the permeability recovery threshold is at least 50%, or at least 60%, or at least 70%, or at least 80%, or at least 90%, or at least 95%, or at least 99%.

In one embodiment, the stimulation treatment is acid fracturing, and the method is employed to evaluate the effectiveness/success of acid fracturing in the subterranean formation 202 surrounding the well 201.

Acid fracturing (or acid frac) refers to a stimulation treatment of a subterranean formation with a stimulation fluid, wherein the stimulation fluid, which may be a reactive acid, is pumped into the wellbore with a pressure above fracture pressure of the subterranean formation. Acid fracturing induces fractures in the subterranean formation, followed by etching open faces of the induced fractures. When acid fracturing is completed and the induced fractures are closed, etched faces may provide a greater permeability recovery. Proppants may be present during acid fracturing operations. Proppants refer to sized particles that are mixed with the stimulation fluid to hold the hydraulic fractures open after a hydraulic fracturing treatment.

According to a second aspect, the present disclosure relates to a method of evaluating the effectiveness of matrix acidizing in a subterranean formation 202 in a plurality of sections 301 of a well 201, involving dividing the well 201 into the plurality of sections 301.

Figure 3:
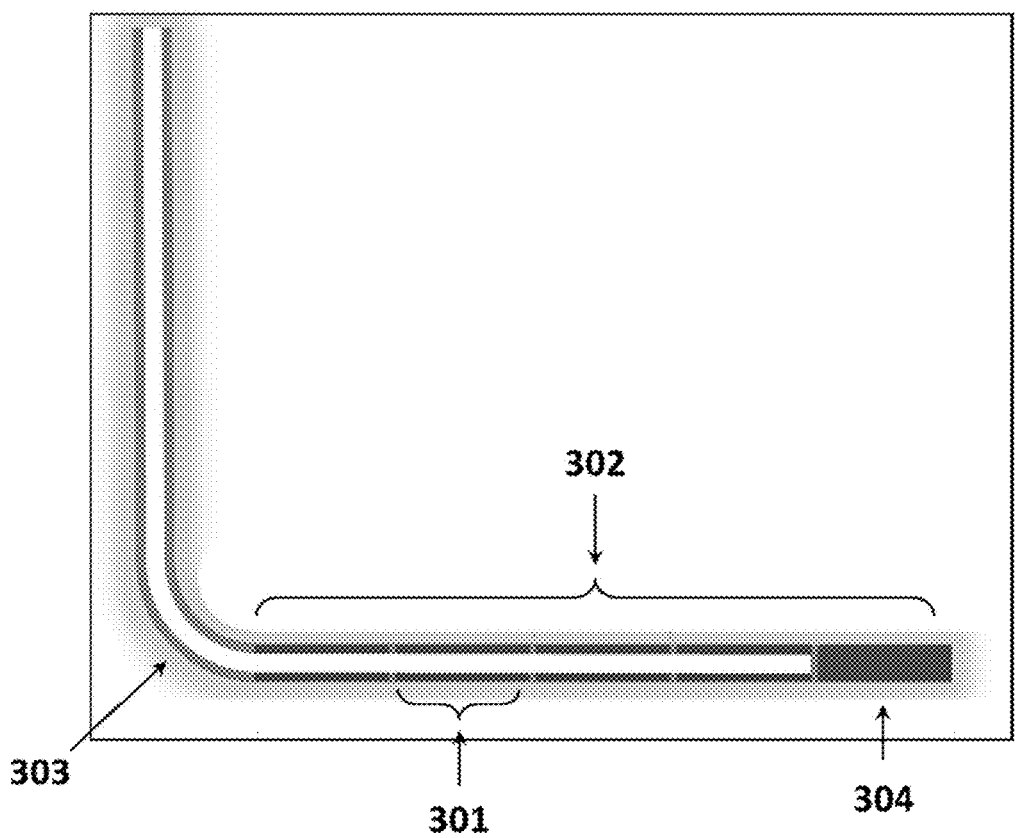
FIG. 3 represents a horizontal well, wherein a lateral section of a well is divided into a plurality of sections.

Referring now to FIG. 3. Dividing refers to a process whereby a lateral 302 of a wellbore splits into a plurality of sections 301, wherein the plurality of sections are separated from each other by diverters. The diverter may be a ball sealer, a packer, and/or a straddle-packer assembly. The diverter may also be a chemical agent such as benzoic acid, an oil-soluble resin, and/or a polymer gel. In one embodiment, diverting the stimulation fluid is performed using a viscous fluid such as a polymer gel. In one embodiment, the lateral 302 of the wellbore has a length in the range of 100-10,000 m, preferably 200-2,000 m, more preferably 500-1,000 m, and even more preferably around 750 m. In one embodiment, the lateral 302 of the wellbore is divided into at least 2, or at least 3, or at least 4, or at least 5, or at least 6, or at least 7, or at least 8, or at least 9, or at least 10, or at least 20, or at least 30, or at least 40, or at least 50, or at least 100 individual sections 301. In one embodiment, number of the individual sections 301 in the lateral 302 of the wellbore is determined based on the initial permeability log, which is obtained by the well logging tool. In one embodiment, the individual sections 301 have the same length. In one embodiment, the length of the individual sections 301 is different. In one embodiment, the individual sections 301 have a length in the range of 10-500 m, preferably 50-300 m, more preferably 120-200 m, and even more preferably around 150 m.

In one embodiment, the wellbore is selected from the group consisting of a vertical wellbore, a horizontal wellbore, a multi-lateral wellbore, an extended reach wellbore, and a maximum reservoir contact (MRC) wellbore. In one embodiment, the wellbore is a horizontal wellbore and the lateral 302 is located in the horizontal section of the wellbore. In one embodiment, the wellbore is a multi-lateral wellbore, wherein at least one lateral is located in at least one lateral branch of the wellbore. In one embodiment, the lateral 302 may be located in a vertical section of the well.

The method involves injecting a first concentration of a first salt solution 406 into a first section 401.

The method involves injecting a first concentration of a second salt solution 407 into a second section 402.

Figure 4:
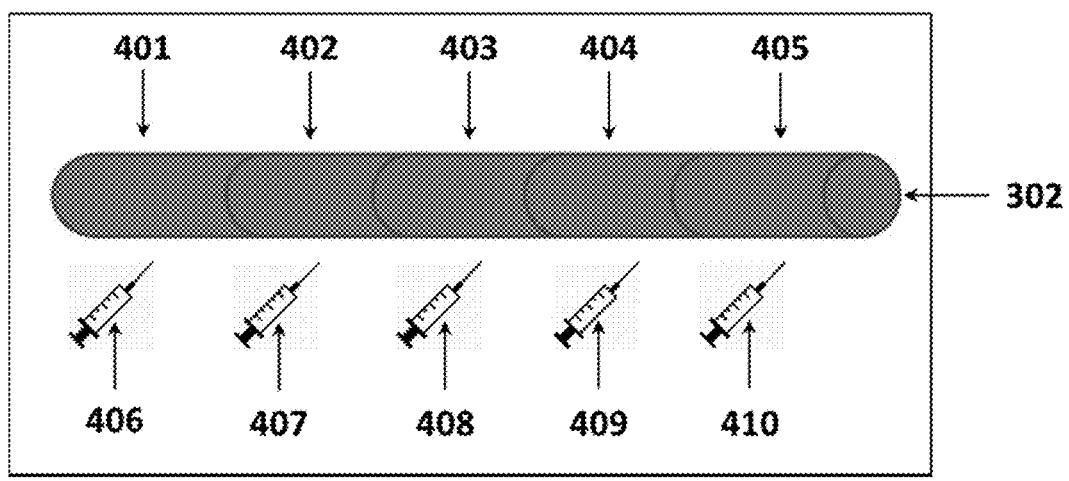
FIG. 4 is represents a lateral section of a well, which is divided into a plurality of sections, wherein salt solutions are injected.

Referring now to FIG. 3. and FIG. 4. In one embodiment, a plurality of salt solutions is injected in the plurality of the sections 301. In one embodiment, the lateral 302 of the wellbore is divided into five sections, wherein a first salt solution 406 is injected into a first section 401, a second salt solution 407 is injected into a second section 402, a third salt solution 408 is injected into a third section 403, a fourth salt solution 409 is injected into a fourth section 404, and a fifth salt solution 410 is injected into a fifth section 405. In one embodiment, the lateral 302 of the wellbore is divided into five sections, wherein the first salt solution 406, the second salt solution 407, the third salt solution 408, the fourth salt solution 409, and the fifth salt solution 410 are the same. In one embodiment, the lateral 302 of the wellbore is divided into five sections, wherein the first salt solution 406, the second salt solution 407, the third salt solution 408, the fourth salt solution 409, and the fifth salt solution 410 are different. In one embodiment, the lateral 302 of the wellbore is divided into five sections, wherein the first salt in the first salt solution 406, the second salt in the second salt solution 407, the third salt in the third salt solution 408, the fourth salt in the fourth salt solution 409, and the fifth salt in the fifth salt solution 410 are each independently selected from the group consisting of lithium chloride, sodium chloride, potassium chloride, cesium chloride, magnesium chloride, calcium chloride, barium chloride, and manganese chloride, iron chloride, nickel chloride, copper chloride, zinc chloride, ammonium chloride, lithium bromide, sodium bromide, potassium bromide, cesium bromide, magnesium bromide, calcium bromide, barium bromide, and manganese bromide, iron bromide, nickel bromide, copper bromide, zinc bromide, and ammonium bromide.

First concentration of the first salt solution, first concentration of the second salt solution, first concentration of the third salt solution, first concentration of the fourth salt solution, and first concentration of the fifth salt solution refer to initial concentrations of the first salt solution 406, the second salt solution 407, the third salt solution 408, the fourth salt solution 409, and the fifth salt solution 410 being injected to the subterranean formation 202. In one embodiment, the lateral 302 of the wellbore is divided into five sections, wherein the first concentration of the first salt solution 406, the first concentration of the second salt solution 407, the first concentration of the third salt solution 408, the first concentration of the fourth salt solution 409, and the first concentration of the fifth salt solution 410 are the same. In one embodiment, the lateral 302 of the wellbore is divided into five sections, wherein the first concentration of the first salt solution 406, the first concentration of the second salt solution 407, the first concentration of the third salt solution 408, the first concentration of the fourth salt solution 409, and the first concentration of the fifth salt solution 410 are different. In one embodiment, the lateral 302 of the wellbore is divided into five sections, wherein the first concentration of the first salt solution 406, the first concentration of the second salt solution 407, the first concentration of the third salt solution 408, the first concentration of the fourth salt solution 409, and the first concentration of the fifth salt solution 410 are in the range of 100-500,000 ppm, or preferably 500-100,000 ppm, or preferably 500-50,000 ppm, or preferably 500-40,000 ppm, or preferably 500-30,000 ppm, or preferably 500-20,000 ppm, or preferably 500-10,000 ppm, or preferably 500-5,000 ppm, or preferably 500-4,000 ppm, or preferably 500-3,000 ppm, or preferably 500-2,000 ppm, or preferably 500-1,500 ppm, or preferably around 1,000 pm.

Similar strategies of division and salt injection may be used for wells that are divided into more or less than five sections.

The method involves matrix acidizing the subterranean formation 202 by injecting a stimulation fluid 203 into the subterranean formation 202 surrounding the plurality of sections 301.

The method involves producing the well 201 to form the formation fluid.

The method further involves collecting the fluid mixture comprising the formation fluid, the stimulation fluid 203, second concentration of the first salt solution 406, and second concentration of the second salt solution 407 at the surface of the well 201.

The second concentration of the first salt solution and the second concentration of the second salt solution as used herein refer to the cumulative concentrations of the first salt solution 406 and the second salt solution 407 being collected at the surface of the well 201 after completion of collecting the fluid mixture. In one embodiment, the lateral 302 of the wellbore is divided into five sections, wherein the second concentration of the first salt solution 406, the second concentration of the second salt solution 407, the second concentration of the third salt solution 408, the second concentration of the fourth salt solution 409, and the second concentration of the fifth salt solution 410 are in the range of 100-500,000 ppm, or preferably 200-100,000 ppm, or preferably 200-50,000 ppm, or preferably 200-40,000 ppm, or preferably 200-30,000 ppm, or preferably 200-20,000 ppm, or preferably 200-10,000 ppm, or preferably 200-5,000 ppm, or preferably 200-4,000 ppm, or preferably 200-3,000 ppm, or preferably 200-2,000 ppm, or preferably 200-1,000 ppm.

The method involves determining a permeability recovery in the first section 401 by calculating a ratio of the second concentration of the first salt solution to the first concentration of the first salt solution, and a permeability recovery in the second section 402 by calculating a ratio of the second concentration of the second salt solution to the first concentration of the second salt solution.

In one embodiment, the initial permeability log is obtained by the well logging tool. In one embodiment, number of the plurality of sections 301 in the lateral 302 of the wellbore is determined based on the initial permeability log. In one embodiment, the lateral 302 of the wellbore is divided into five sections, wherein the permeability recovery in the first section 401 is the ratio of the second concentration of the first salt solution to the first concentration of the first salt solution, the permeability recovery in the second section 402 is the ratio of the second concentration of the second salt solution to the first concentration of the second salt solution, the permeability recovery in the third section 403 is the ratio of the second concentration of the third salt solution to the first concentration of the third salt solution, the permeability recovery in the fourth section 404 is the ratio of the second concentration of the fourth salt solution to the first concentration of the fourth salt solution, and the permeability recovery in the fifth section 405 is the ratio of the second concentration of the fifth salt solution to the first concentration of the fifth salt solution. In one embodiment, the lateral 302 of the wellbore is divided into five sections, wherein the ratio of the second concentration of the first salt solution to the first concentration of the first salt solution, the ratio of the second concentration of the second salt solution to the first concentration of the second salt solution, the ratio of the second concentration of the third salt solution to the first concentration of the third salt solution, the ratio of the second concentration of the fourth salt solution to the first concentration of the fourth salt solution, and the ratio of the second concentration of the fifth salt solution to the first concentration of the fifth salt solution is in the range of 0-1, preferably 0.1-0.9, more preferably 0.2-0.9.

In one embodiment, the lateral 302 of the wellbore is divided into five sections, wherein the permeability recovery in the first section 401 is compared with a first permeability recovery threshold, the permeability recovery in the second section 402 is compared with a second permeability recovery threshold, the permeability recovery in the third section 403 is compared with a third permeability recovery threshold, the permeability recovery in the fourth section 404 is compared with a fourth permeability recovery threshold, and the permeability recovery in the fifth section 405 is compared with a fifth permeability recovery threshold. In one embodiment, the lateral 302 of the wellbore is divided into five sections, wherein the permeability recovery in the first section 401, the permeability recovery in the second section 402, the permeability recovery in the third section 403, the permeability recovery in the fourth section 404, and the permeability recovery in the fifth section 405 are in the range of 0-1, preferably 0.1-0.9, more preferably 0.2-0.9. In one embodiment, values of the first permeability recovery threshold, the second permeability recovery threshold, the third permeability recovery threshold, the fourth permeability recovery threshold, and the fifth permeability recovery threshold are the same. In one embodiment, values of the first permeability recovery threshold, the second permeability recovery threshold, the third permeability recovery threshold, the fourth permeability recovery threshold, and the fifth permeability recovery threshold are different. In one embodiment, the first permeability recovery threshold, the second permeability recovery threshold, the third permeability recovery threshold, the fourth permeability recovery threshold, and the fifth permeability recovery threshold are at least 50%, or at least 60%, or at least 70%, or at least 80%, or at least 90%, or at least 95%, or at least 99%.

In one embodiment, the lateral 302 of the wellbore is divided into five sections, wherein the matrix acidizing is evaluated to be effective when the permeability recovery in the first section 401 is greater than the first permeability recovery threshold, and the permeability recovery in the second section 402 is greater than the second permeability recovery threshold, and the permeability recovery in the third section 403 is greater than the third permeability recovery threshold, and the permeability recovery in the fourth section 404 is greater than the fourth permeability recovery threshold, and the permeability recovery in the fifth section 405 is greater than the fifth permeability recovery threshold. In one embodiment, the lateral 302 of the wellbore is divided into five sections, wherein the matrix acidizing is evaluated to be successful when the permeability recovery of at least one of the plurality of sections is greater than a permeability recovery threshold corresponded to that section.

In one embodiment, the lateral 302 of the wellbore is divided into the plurality of sections 301, wherein the permeability recovery of each of the plurality of sections 301 may be used to measure a contribution of each of the plurality of sections 301 to a total production flow of the formation fluid.

In one embodiment, the lateral 302 of the wellbore is divided into the plurality of sections 301, wherein a permeability variation along the length of the well is determined from the permeability recovery and initial permeability of each of the plurality of sections 301.

Permeability variation as used herein refers to a second permeability log that shows a second permeability of each of the plurality of sections after completion of the stimulation treatment. In one embodiment, the permeability variation is employed to determine the contribution of each of the plurality of sections to the total production flow of the formation fluid.

In one embodiment, the permeability variation is employed as an alternative method for production logging. In one embodiment, the permeability variation is employed as an indicating parameter to verify the production logging results.

Production logging refers to a record of one or more in-situ measurements that describe nature of the subterranean formation surrounding a wellbore. Exemplary of the in-situ measurements by production logging include, but not limited to geological properties (i.e. permeability, porosity, etc.), electrical properties (i.e. resistivity, conductivity, etc.), sonic properties, dimensional measurements of the wellbore, formation fluid sampling, and formation pressure measurement. One purpose of production logging is to monitor the effectiveness of stimulation treatments such as matrix acidizing. In one embodiment, the method of the present disclosure is used as an alternative for production logging. In one embodiment, cost of the production logging is at least 100%, or at least 200%, or at least 300%, or at least 400%, or at least 500%, or at least 1000%, or at least 1500% higher than cost of the method.

In one embodiment, the method is employed to evaluate the effectiveness of diverting the stimulation fluid 203. In one embodiment, the effectiveness of diverting the stimulation fluid is evaluated from the permeability recovery in each of the plurality of sections 301. In one embodiment, diverting the stimulation fluid 203 is effective when the permeability recovery in all of the plurality of sections 301 is higher than a predetermined threshold. The predetermined threshold may be at least 10%, or at least 20%, or at least 30%, or at least 40%, or at least 50%, or at least 60%, or at least 70%, or at least 80%, or at least 90%, or at least 95%, or at least 99%. In one embodiment, diverting the stimulation fluid to a localized section of a wellbore is successful when the permeability recovery at the localized section of the wellbore is higher than the predetermined threshold. In one embodiment, diverting the stimulation fluid to a lateral toe section 304 of a wellbore is successful when the permeability recovery at the lateral toe section 304 is at least 10%, or at least 20%, or at least 30%, or at least 40%, or at least 50%, or at least 60%, or at least 70%, or at least 80%, or at least 90%, wherein the distance between the lateral toe section 304 and a heel section 303 of the wellbore is in the range of 200-5,000 m, preferably 300-1,000 m, more preferably 500-800 m. Heel section of a wellbore may refer to a region in the wellbore, where the lateral meets the main/central borehole.

Diverting the stimulation fluid refers to a process of transferring the stimulation fluid to ensure a uniform distribution of the stimulation fluid across the wellbore. The stimulation fluid tends to follow a path of high permeable areas, resulting in low permeable areas not to receive adequate stimulation treatment. In one embodiment, diverting the stimulation fluid is performed through using ball sealers, packers, and/or straddle-packer assemblies. In one embodiment, diverting the stimulation fluid is performed through using a chemical agent such as benzoic acid, and/or oil-soluble resins. In one embodiment, diverting the stimulation fluid is performed through using a viscous fluid such as a polymer gel.

In one embodiment, the stimulation treatment is acid fracturing, and the method is employed to evaluate the effectiveness/success of acid fracturing in the plurality of sections 301 in the wellbore. In one embodiment, evaluating the effectiveness/success of acid fracturing is substantially similar to evaluating the effectiveness of matrix acidizing in the plurality of sections in the wellbore.

The examples below are intended to further illustrate protocols for evaluating the effectiveness of matrix acidizing in a subterranean formation in a plurality of sections of a well, and are not intended to limit the scope of the claims.

Example 1

As shown in FIG. 3, a horizontal lateral with 2500 ft length is divided into five sections of 500 ft each. As shown in FIG. 4, different salt solutions are injected to each of the sections prior to starting the treatment process. The treatment for each lateral could be four stages that end up with a diverter to separate between the stimulation of different parts. Salts with high solubility in water such as potassium chloride, cesium chloride, ammonium chloride, barium chloride, and/or manganese chloride are selected. These salts do not react with the formation fluid and the stimulation fluid, therefore, precipitation of minerals scales does not happen.

Example 2

Figure 5:
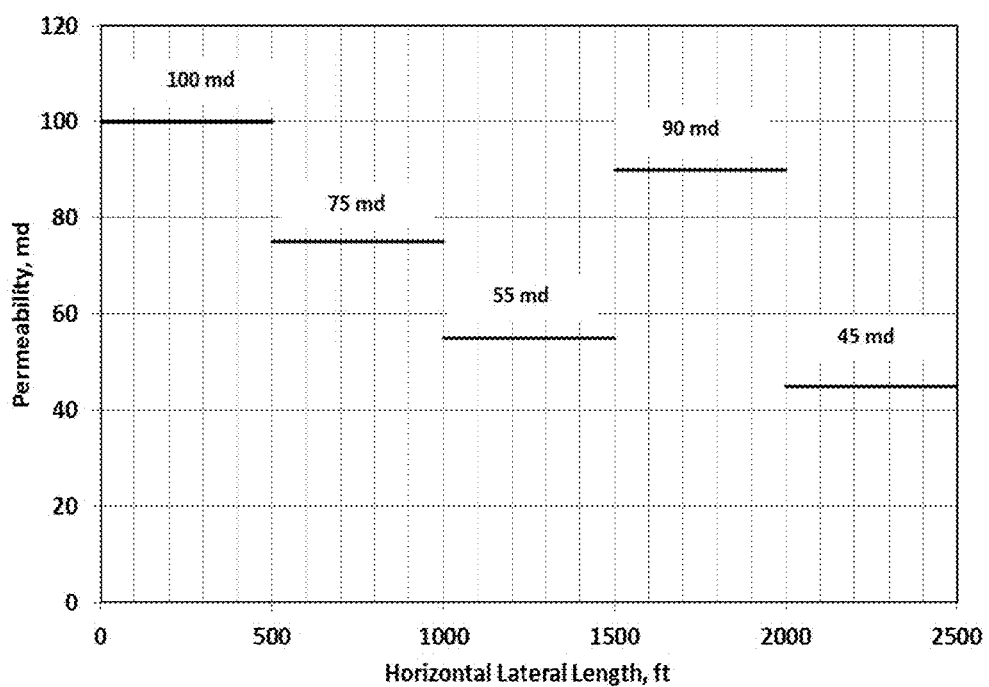
FIG. 5 is a plot of permeability of a plurality of sections along a lateral section of a well.

FIG. 5 shows a heterogeneous horizontal reservoir that is divided into 5 sections based on permeability contrast. Before the acidizing operation, five cationic salt solutions were injected in each of the horizontal sections with equal concentration of 1000 ppm. After the acidizing treatment, the well was produced and the concentration of each cation was collected at the surface. The flow back of each cationic salt solution gave an indication of the effect of the stimulation treatment on this section. For example, if the flow back of a cationic salt solution is equal to the injected concentration of the cationic salt solution in a section, this implies that the section has 100% retained permeability and the formation becomes very clean upon treatment.

Example 3

Figure 6:
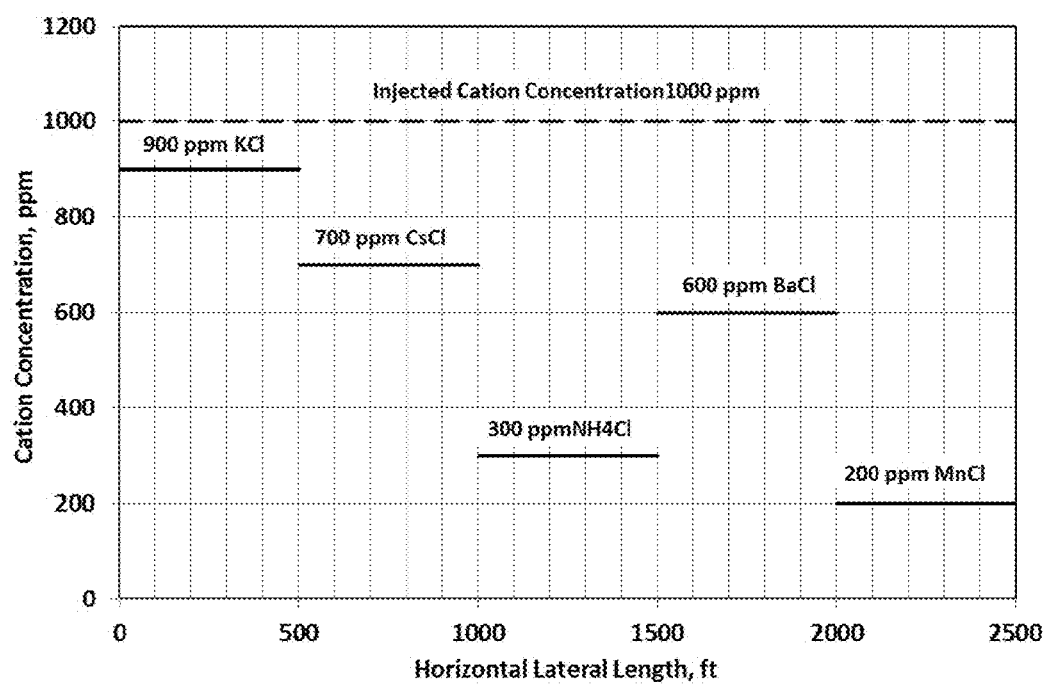
FIG. 6 is a plot of initial concentration and collected concentration of salt solutions from a plurality of sections along a lateral section of a well.

FIG. 6 shows the injected salt solution concentrations and the flow back salt solution concentrations in each section. Accordingly, 90% of the first salt solution, which was injected to the high permeability section (the section that has a permeability of 100 md), was collected at the surface. This implies that this section has a permeability recovery of 90%. While 20% of the fifth salt solution, which was injected to the low permeability section (the section that has a permeability of 45 md), was collected at the surface. This also implies that this section was not stimulated well and the permeability recovery was about 20%. The second section (that has a permeability of 75 md) revealed a permeability recovery of 70%, while the fourth section (the section that has a permeability of 90 md) revealed a 60% permeability recovery. The third section (that has a permeability of 55 md) revealed a permeability recovery of 30%. The obtained results confirmed that the stimulation job was not effective. It further implies that a large portion of the acid was consumed in the high permeability section (the first section) near the lateral heel. The results further indicate that the acid diversion was not effective as the permeability recovery was a small number for the low permeability section (i.e. the fifth section) at the lateral toe.

The invention claimed is:

1. A method of evaluating the effectiveness of matrix acidizing in a subterranean formation surrounding a well, comprising:
    injecting a first concentration of at least one salt solution into the subterranean formation;
    matrix acidizing the subterranean formation by injecting a stimulation fluid;
    producing the well to form a formation fluid;
    collecting a fluid mixture comprising the formation fluid, the stimulation fluid, and a second concentration of at least one salt solution at a surface of the well; and
    determining a permeability recovery by calculating a ratio of the second concentration of at least one salt solution to the first concentration of at least one salt solution.

2. The method of claim 1, further comprising:
    comparing the permeability recovery with a permeability recovery threshold to evaluate the effectiveness of matrix acidizing in the subterranean formation.

3. The method of claim 1, wherein the matrix acidizing is effective in restoring permeability of the subterranean formation when the permeability recovery is at least 60%.

4. The method of claim 1, wherein salt in the salt solution is at least one selected from the group consisting of potassium chloride, cesium chloride, ammonium chloride, barium chloride, and manganese chloride.

5. The method of claim 4, wherein the salt in the salt solution is soluble in water.

6. The method of claim 4, wherein the salt in the salt solution is chemically inert in the formation fluid and the stimulation fluid.

7. The method of claim 1, wherein the stimulation fluid is injected into the subterranean formation at a pressure to fracture the formation.

8. The method of claim 1, wherein the stimulation fluid comprises at least one selected from the group consisting of hydrochloric acid, acetic acid, formic acid, hydrofluoric acid, oxalic acid, and fluoroboric acid.

9. The method of claim 1, wherein the well is selected from the group consisting of a vertical well, a horizontal well, a multi-lateral well, an extended reach well, and a maximum reservoir contact well.

10. The method of claim 1, wherein the subterranean formation is a heterogeneous formation.

11. A method of evaluating the effectiveness of matrix acidizing in a subterranean formation in a plurality of sections of a well, comprising:
dividing the well into the plurality of sections;
injecting a first concentration of a first salt solution into a first section;
injecting a first concentration of a second salt solution into a second section;
matrix acidizing the subterranean formation by injecting a stimulation fluid into the subterranean formation surrounding the plurality of sections;
producing the well to form a formation fluid;
collecting a fluid mixture comprising the formation fluid, the stimulation fluid, a second concentration of the first salt solution, and a second concentration of the second salt solution at a surface of the well; and
determining a permeability recovery in the first section by calculating a ratio of the second concentration of the first salt solution to the first concentration of the first salt solution, and a permeability recovery in the second section by calculating a ratio of the second concentration of the second salt solution to the first concentration of the second salt solution.

12. The method of claim 11, further comprising:
comparing the permeability recovery of the first and the second section with a permeability recovery threshold.

13. The method of claim 11, wherein the first salt solution is the same as the second salt solution.

14. The method of claim 11, wherein the first salt solution is different than the second salt solution.

15. The method of claim 11, wherein the first concentration of the first salt solution is the same as the first concentration of the second salt solution.

16. The method of claim 11, wherein the first concentration of the first salt solution is different than the first concentration of the second salt solution.

17. The method of claim 11, wherein the well is selected from the group consisting of a vertical well, a horizontal well, a multi-lateral well, an extended reach well, and a maximum reservoir contact well.

18. The method of claim 11, further comprising:
determining a permeability variation along the length of the well from the permeability recovery of the first and the second section.

19. The method of claim 11, wherein the stimulation fluid is diverted and the method is employed to evaluate the effectiveness of diverting from the permeability recovery of the first and the second section.

20. The method of claim 11, further comprising:
determining a contribution of each of the first and the second section to a total production of the formation fluid from the permeability recovery of the first and the second section.

\* \* \* \* \*